(12) United States Patent
Kurumasa et al.

(10) Patent No.: US 10,791,231 B2
(45) Date of Patent: Sep. 29, 2020

(54) IMAGE FORMING APPARATUS, METHOD OF DISPLAYING SCREEN FOR SELECTING APPLICATION, AND COMPUTER PROGRAM

(71) Applicant: Konica Minolta, Inc., Chiyoda-ku, Tokyo (JP)

(72) Inventors: Yoichi Kurumasa, Toyokawa (JP); Taketoshi Yamahata, Toyokawa (JP); Ryosuke Nishimura, Toyokawa (JP); Atsushi Kondo, Itami (JP); Eisaku Owada, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/451,505

(22) Filed: Jun. 25, 2019

(65) Prior Publication Data

US 2020/0014807 A1    Jan. 9, 2020

(30) Foreign Application Priority Data

Jul. 5, 2018    (JP) ................................ 2018-128239

(51) Int. Cl.
| | | |
|---|---|---|
| G06F 15/00 | (2006.01) | |
| G06F 3/12 | (2006.01) | |
| G06K 1/00 | (2006.01) | |
| H04N 1/00 | (2006.01) | |
| G06F 3/0483 | (2013.01) | |
| G06F 3/0481 | (2013.01) | |

(52) U.S. Cl.
CPC ....... *H04N 1/00424* (2013.01); *G06F 3/0483* (2013.01); *G06F 3/04817* (2013.01); *G06F 3/1256* (2013.01)

(58) Field of Classification Search
CPC ............ H04N 1/00424; G06F 3/04817; G06F 3/0483; G06F 3/1256
USPC ........................................ 358/1.15, 1.13, 1.1
See application file for complete search history.

(56) References Cited

U.S. PATENT DOCUMENTS

| | | | |
|---|---|---|---|
| 2011/0078618 A1* | 3/2011 | Griep ...................... | G06F 9/451 715/781 |
| 2016/0310218 A1* | 10/2016 | Ruckel ................... | A61B 90/37 |
| 2017/0277393 A1* | 9/2017 | Iwashita ............. | G06F 3/04817 |

FOREIGN PATENT DOCUMENTS

| | | |
|---|---|---|
| JP | 2007293460 | 11/2007 |
| JP | 2009122862 | 6/2009 |
| JP | 2010538394 | 12/2010 |

* cited by examiner

*Primary Examiner* — Douglas Q Tran
(74) *Attorney, Agent, or Firm* — BakerHostetler (57) ABSTRACT

Disclosed is an image forming apparatus that may include: an acquisitor that may obtain a first icon of each of a plurality of applications; a generator that may generate a second icon of each of the plurality of applications by superimposing the first icon onto each base image having a same size or a shape; and a display controller that may cause a display to display a selection screen in which the second icon of each of the plurality of applications is arranged to allow a user to select any of the plurality of applications.

22 Claims, 9 Drawing Sheets

| APPLICATION NAME | PATH | CUSTOM ICON | POSITION | |
|---|---|---|---|---|
| COPY | native¥copy |  | N03 | 5A<br>6A |
| STORAGE ABC | storage.example.com/users |  | N11 | 5A<br>6A |
| SCAN TO PC | native¥scan-to-pc |  | N04 | 5A<br>6A |
| FAX | native¥fax |  | N10 | 5A<br>6A |
| ⋮ | ⋮ | ⋮ | ⋮ | |

IMAGE FORMING APPARATUS, METHOD OF DISPLAYING SCREEN FOR SELECTING APPLICATION, AND COMPUTER PROGRAM

This application claims priority to Japanese patent Application No. 2018-128239, filed on Jul. 5, 2018, which is incorporated herein by reference in its entirety.

BACKGROUND

Technological Field

The present disclosure relates to a technique of providing a screen for selecting an application.

Description of the Related art

In recent years, an image forming apparatus having various functions, such as copy, scanning, fax, and a document server, has become widespread. Such an image forming apparatus may also be referred to as a "multifunctional machine" or a "multifunction peripheral" (MFP).

Those functions are implemented by an application fixedly installed in advance at the time of shipment of the image forming apparatus. Such an application is generally referred to as a "native application" of a "built-in application".

Furthermore, in recent years, a versatile platform, such as a Java platform and a web platform, has been provided in the image forming apparatus. Accordingly, extensibility of the image forming apparatus has become higher than ever, and applications of various functions that operate on such platforms have been provided in the image forming apparatus. It may be provided by a third-party vendor as well as a maker of the image forming apparatus. Note that "Java" is a registered trademark.

Moreover, the following techniques have been conventionally proposed as techniques for allowing a user to select an application to be used from among a plurality of applications.

The technique disclosed in JP 2007-293460 A includes a step of activating a user customization block incorporated in an arithmetic device, a step of enabling selection of a specific icon from among a plurality of icons arranged on a display screen of a display device, and a step of enabling various changes in response to a request from the user by selecting various units included in the user customization block.

A portable electronic device disclosed in JP 2010-538394 A displays an icon (e.g., graphic object) in one or more areas of a user interface of a touch-sensitive display, and detects user input for specifying an exchange of a position of the icon. In one aspect, respective positions of two icons in the user interface can be selected to exchange positions in one or more areas of the user interface, and one of or both of the icons can change visual appearance to indicate selected states thereof.

In addition, techniques for allowing the user to easily perform setting of processing have been proposed. An operation panel disclosed in JP 2009-122862 A includes an operation unit that inputs an operational instruction, a display unit that displays an operation screen, a control unit that causes the display unit to display a different operation screen each time a setting button in the operation screen is operated, and a storage unit that stores the selected setting button. The control unit counts the number of times of use of each setting button, and stores it in the storage unit. When a setting screen is displayed, the control unit detects the number of times of use of each setting button, and changes a pattern to be displayed on the display unit depending on the number of times of use.

Respective icons of applications disclosed in JP 2007-293460 A have the same sizes and shapes, and are arranged on a menu screen. This mechanism is considered to be because a maker of a portable electronic device sets a standard of the icon and a provider of the application conforms to the standard.

However, the provider of the application does not necessarily conform to the standard at all times. Accordingly, icons of various sizes or shapes may just have to be arranged on the menu screen.

However, a display device included in an image forming apparatus has a distance from the user's eyes longer than that of the display device included in the portable electronic device. Therefore, particularly in the image forming apparatus, visibility for the user is poor if icons of various sizes or shapes are mixed.

SUMMARY

The present disclosure has been conceived in view of the problems as described above, and an object of the present disclosure may be to provide a user with a menu screen with visibility higher than ever in the case where applications for an image forming apparatus are provided by various providers.

To achieve the abovementioned object, according to an aspect of the present disclosure, an image forming apparatus reflecting one or more aspects of the present disclosure may comprise: an acquisitor that obtains a first icon of each of a plurality of applications; a generator that generates a second icon of each of the plurality of applications by superimposing the first icon onto each base image having a same size or a shape; and a display controller that causes a display to display a selection screen in which the second icon of each of the plurality of applications is arranged to allow a user to select any of the plurality of applications.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Hereinafter, one or more embodiments of the present disclosure will be described with reference to the drawings. However, the scope of the disclosure is not limited to the disclosed embodiments.

Figure 1:
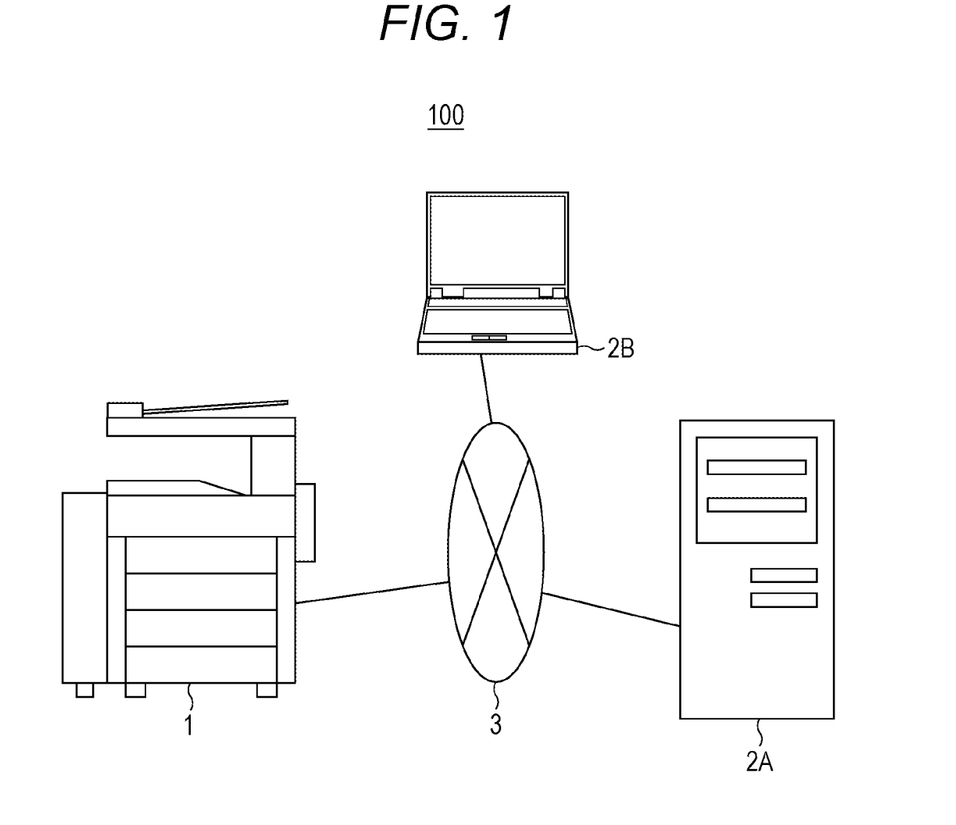
FIG. 1 is a diagram illustrating an exemplary overall configuration of an image processing system.
Figure 2:
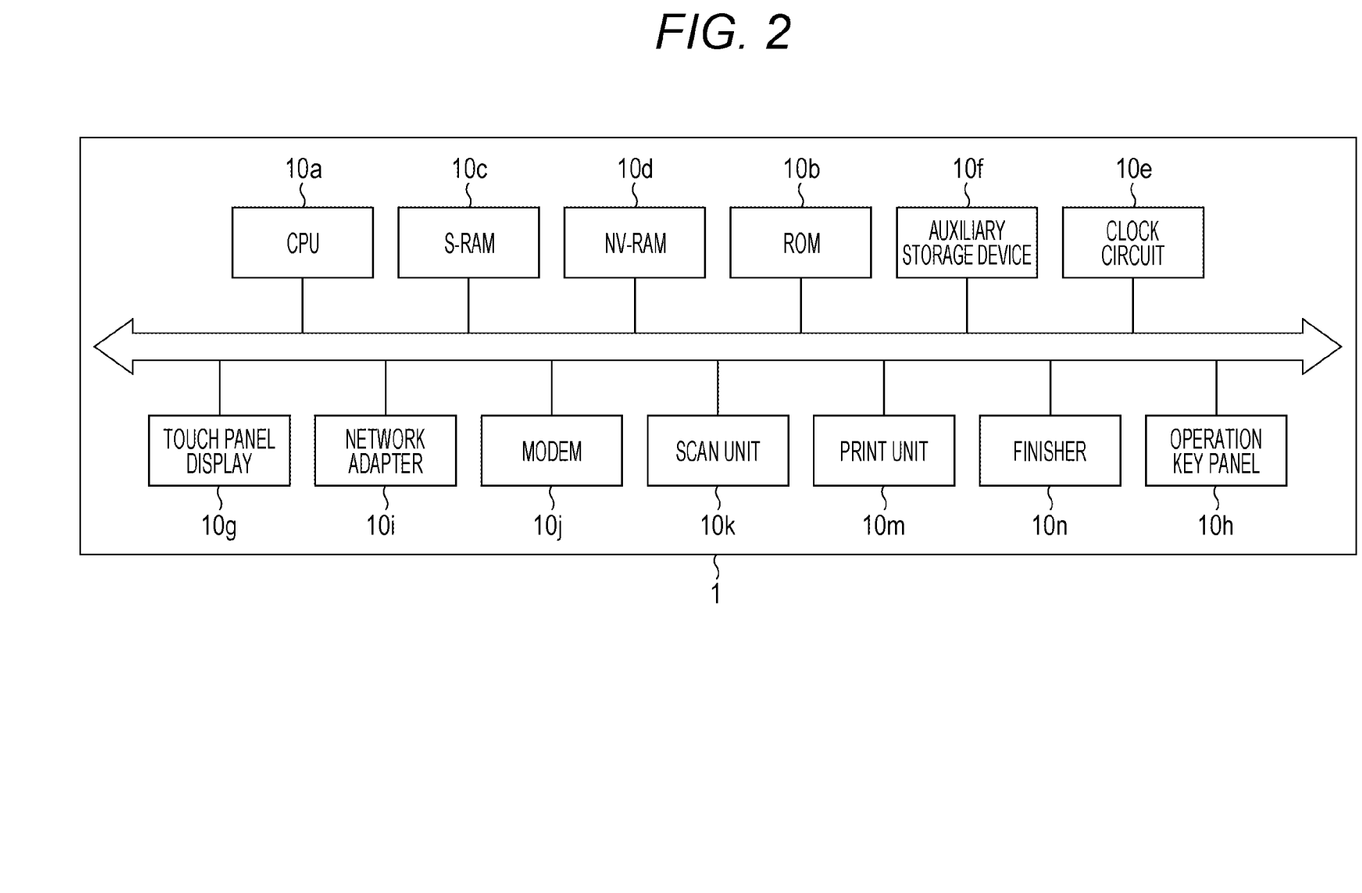
FIG. 2 is a diagram illustrating an exemplary hardware configuration of an image forming apparatus.

FIG. 1 is a diagram illustrating an exemplary overall configuration of an image processing system 100. FIG. 2 is a diagram illustrating an exemplary hardware configuration of an image forming apparatus 1.

The image processing system 100 illustrated in FIG. 1 is a system for printing an image on a paper sheet (printing sheet) and handling the image as electronic data, and includes the image forming apparatus 1, a web server 2A, a terminal device 2B, a communication line 3, and the like.

The image forming apparatus 1, the web server 2A, and the terminal device 2B can communicate with each other via the communication line 3. A local area network (LAN) line, the Internet, a public line, a dedicated line, or the like is used as the communication line 3.

The image forming apparatus 1 is an apparatus in which functions of copy, PC print, fax, a scanner, a box, and the like are integrated. In general, it may also be referred to as a "multifunctional machine", a "multifunction peripheral" (MFP), or the like.

The PC print function is a function of printing an image on a printing sheet on the basis of image data received from the terminal device 2B. It may be referred to as "network printing", "network print", or the like.

The box function is a function by which a storage area called a "box" or a "personal box" is provided for each user so that each user stores and manages image data and the like using his/her own storage area. The box corresponds to a "folder" or a "directory" in a personal computer.

As illustrated in FIG. 2, the image forming apparatus 1 includes a central processing unit (CPU) 10a, a read-only memory (ROM) 10b, a static random access memory (S-RAM) 10c, a non-volatile random access memory (NV-RAM) 10d, a clock circuit (integrated circuit) 10e, an auxiliary storage device 10f, a touch panel display 10g, an operation key panel 10h, a network adapter 10i, a modem 10j, a scan unit 10k, a print unit 10m, a finisher 10n, and the like.

The touch panel display 10g displays a screen showing a message for the user, a screen for allowing the user to input a command or information, a screen showing a result of processing executed by the CPU 10a, and the like. Further, the touch panel display 10g transmits a signal indicating a touched position to the CPU 10a.

The operation key panel 10h is what is called a hardware keyboard, and includes a numeric keypad, a start key, a stop key, a function key, and the like.

The network adapter 10i communications with the web server 2A or the terminal device 2B through the communication line 3 according to a protocol such as a Transmission Control Protocol/Internet Protocol (TCP/IP). A network interface card (NIC), a wireless LAN card, or the like is used as the network adapter 10i.

The modem 10j exchanges image data with a facsimile terminal via a public telephone line according to a protocol such as G3.

The scan unit 10k reads an image on a paper sheet (document sheet) to generate image data.

The print unit 10m prints, on a printing sheet, an image indicated by the image data received from the web server 2A, the terminal device 2B, the facsimile terminal, or the like, as well as the image read by the scan unit 10k.

The finisher 10n performs finishing processing on a paper sheet bearing the image printed by the print unit 10m, that is, a printed material. Specifically, any one or more of processing of binding a paper sheet with a stapler, processing of punching a paper sheet, and processing of folding a paper sheet are performed as the finishing processing.

The S-RAM 10c is a storage device for work, and is used to temporarily store a result of processing performed by the CPU 10a, data transmitted from another device, and the like.

The NV-RAM 10d is used to back up data related to various settings (e.g., Internet Protocol (IP) address, fax number, address book, character size or language of screen, etc.) of the image forming apparatus 1 itself. The clock circuit 10e is a circuit for clocking.

The ROM 10b or the auxiliary storage device 10f stores programs such as an operating system, an application for implementing the functions described above, and a web browser. Further, a Java platform and a web platform are provided above the operating system. For example, an internal web server (IWC), a web browser, and the like are provided.

Furthermore, the ROM 10b or the auxiliary storage device 10f fixedly stores a specific application in advance at the time of shipment of the image forming apparatus 1. Hereinafter, such an application will be described as a "native application". The native application may also be referred to as a "built-in application".

For example, a copy application, a scanning application, a fax application, a box application, and the like are stored as native applications.

The copy application is an application for reading an image on a document sheet and printing (copying) it on a printing sheet. The scanning application is an application for reading an image on a document sheet, generating image data, and storing it in a box.

The fax application is an application for reading an image on a document sheet and transmitting it to a fax terminal by fax. The box application is an application for printing an image on a printing sheet on the basis of image data stored in the box or outputting the image data to an external device.

The user can optionally call and use those native applications.

Furthermore, the user or an administrator can appropriately set up an application other than the native application (hereinafter referred to as "non-native application") in the image forming apparatus 1. The user can optionally call and use a non-native application. Note that the setup may be performed by installing a non-native application in the image forming apparatus 1, or may be performed by registering a network path (e.g., uniform resource locator (URL)) of a web page or a website in the image forming apparatus 1.

The non-native application may be a program executed with the operating system of the image forming apparatus 1 serving as a platform, or may be a program executed with the Java platform or the web platform serving as a platform. In particular, since the specifications of the Java platform and the web platform have been widely known, third-party vendors as well as the makers of the image forming apparatus 1 can develop and provide non-native applications more easily than native applications.

Meanwhile, conventionally, a launcher has been widespread as a function for calling an application. The launcher is a function of arranging an icon for each application in a predetermined area and calling the application corresponding to the icon selected by the user.

The icon of the native application is conventionally designed by the maker of the image forming apparatus 1. However, when the non-native application is provided by a third-party vendor, the icon is designed by the third-party vendor. Therefore, when the icon of the native application and the icon of the non-native application are mixed in a predetermined area, a sense of unify is lost and visibility for the user is deteriorated as compared with the case where only the icons of the native applications are arranged.

In view of the above, the ROM 10*b* or the auxiliary storage device 10*f* stores a home screen providing program 10P. According to the home screen providing program 10P, the problem described above can be solved. Hereinafter, this mechanism will be described.

Figure 3:
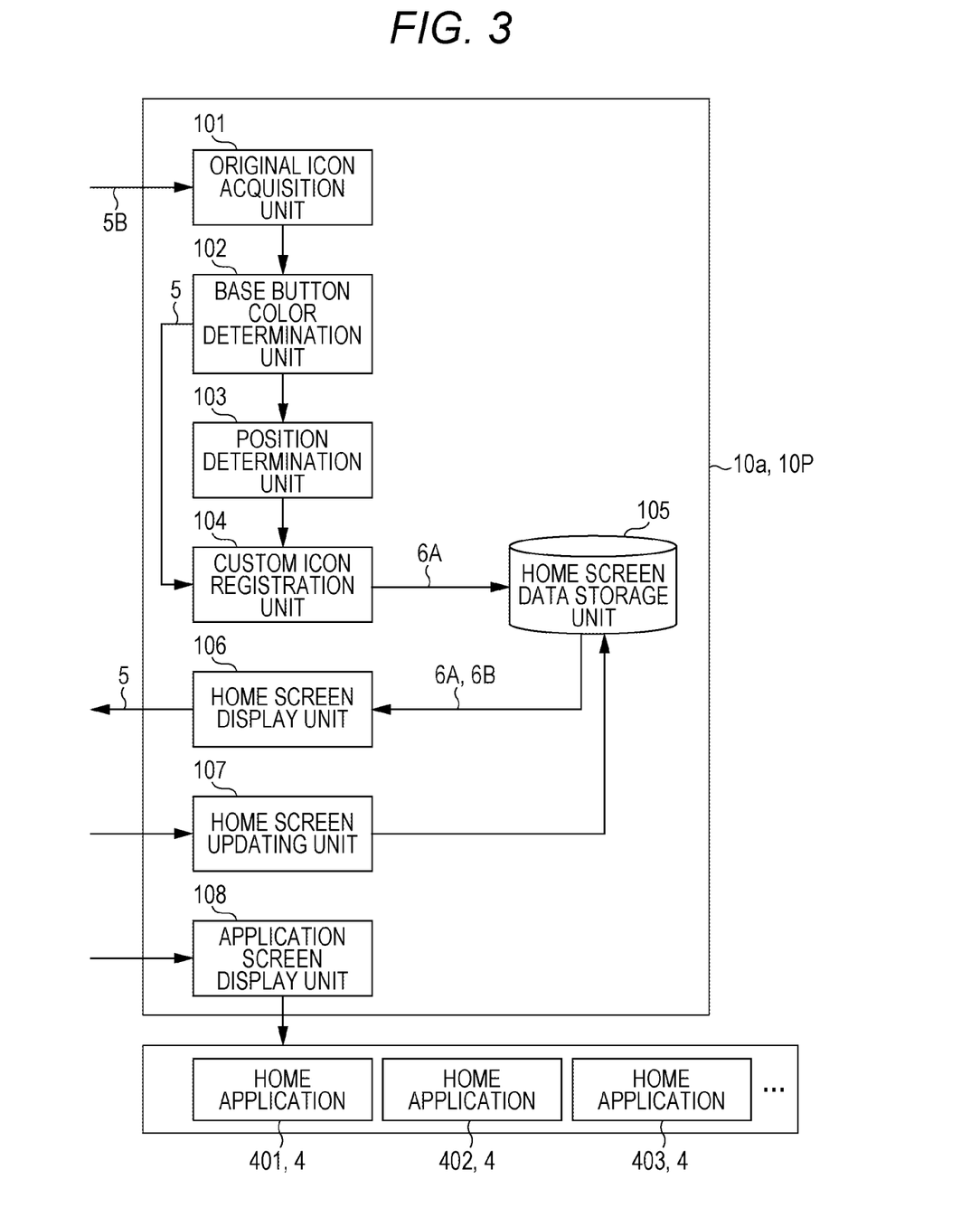
FIG. 3 is a diagram illustrating an exemplary functional configuration of the image forming apparatus.
Figure 4:
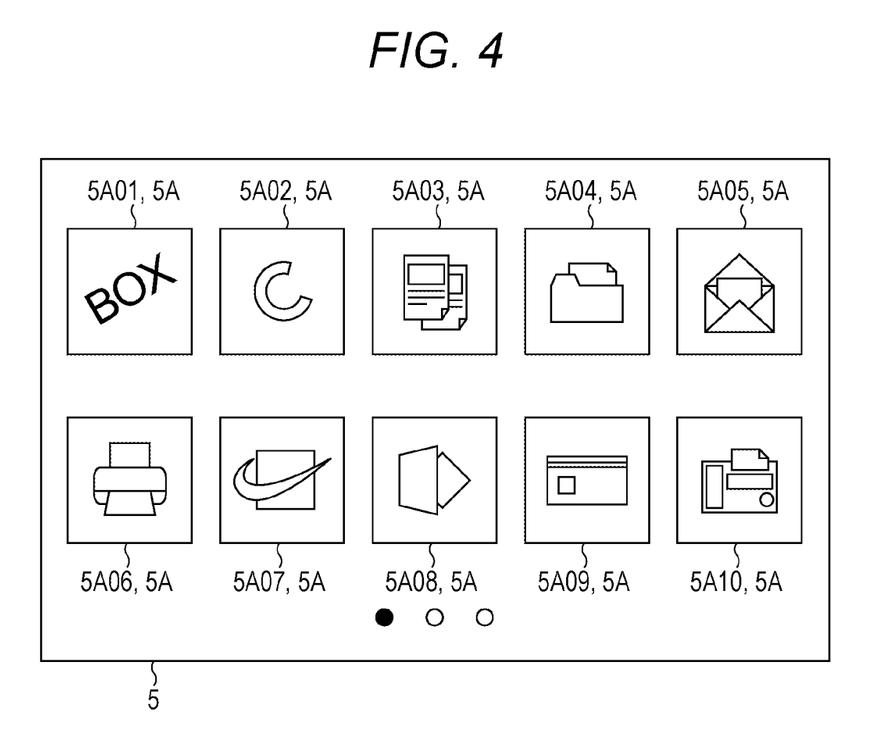
FIG. 4 is a diagram illustrating an exemplary home screen.
Figure 5A:
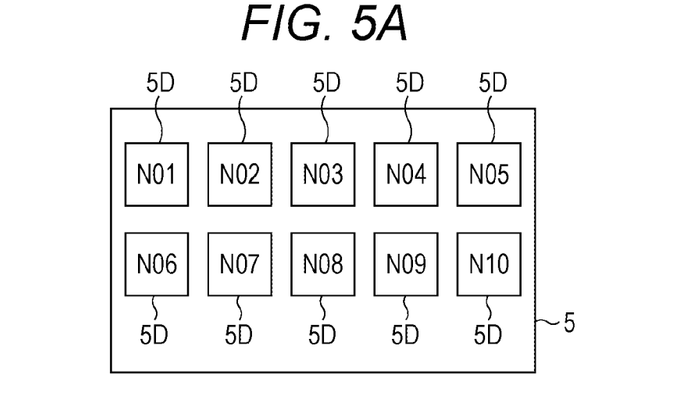
FIGS. 5A and 5B are diagrams illustrating exemplary positions of areas in the home screen.
Figure 5B:
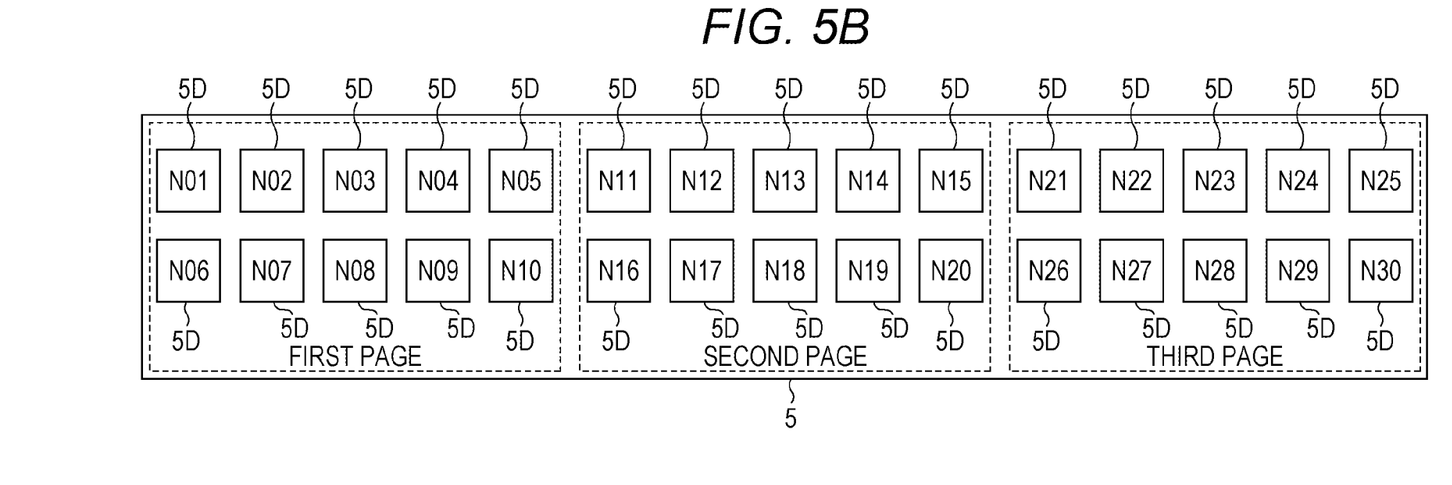
Figure 6A:
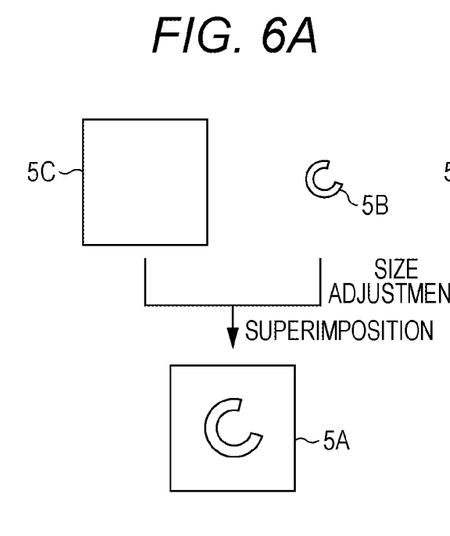
FIGS. 6A to 6D are diagrams for illustrating an exemplary method of generating a custom icon.
Figure 6B:
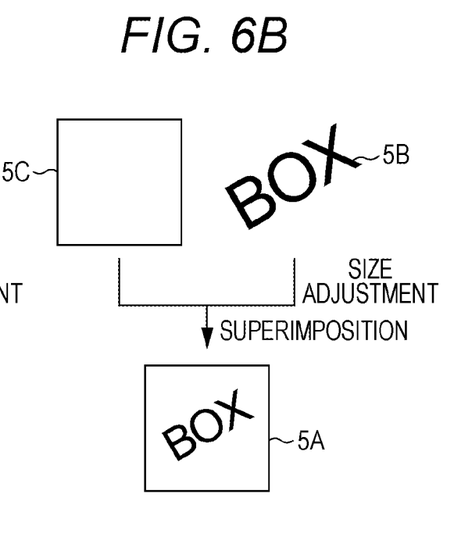
Figure 6C:
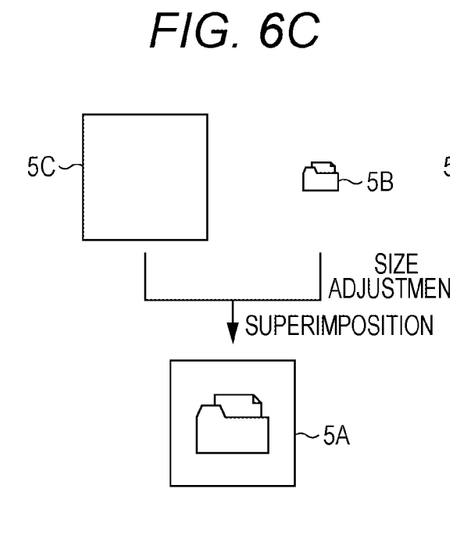
Figure 6D:
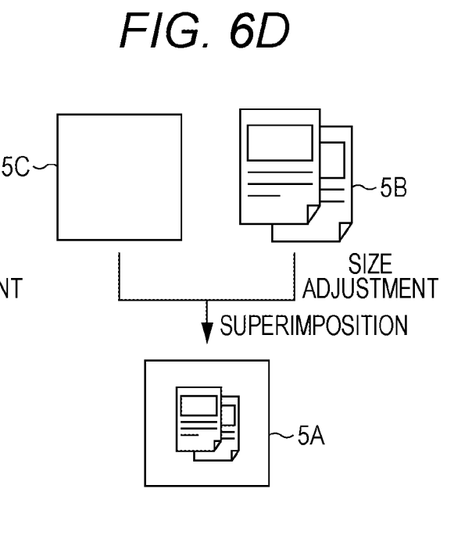
Figure 7:
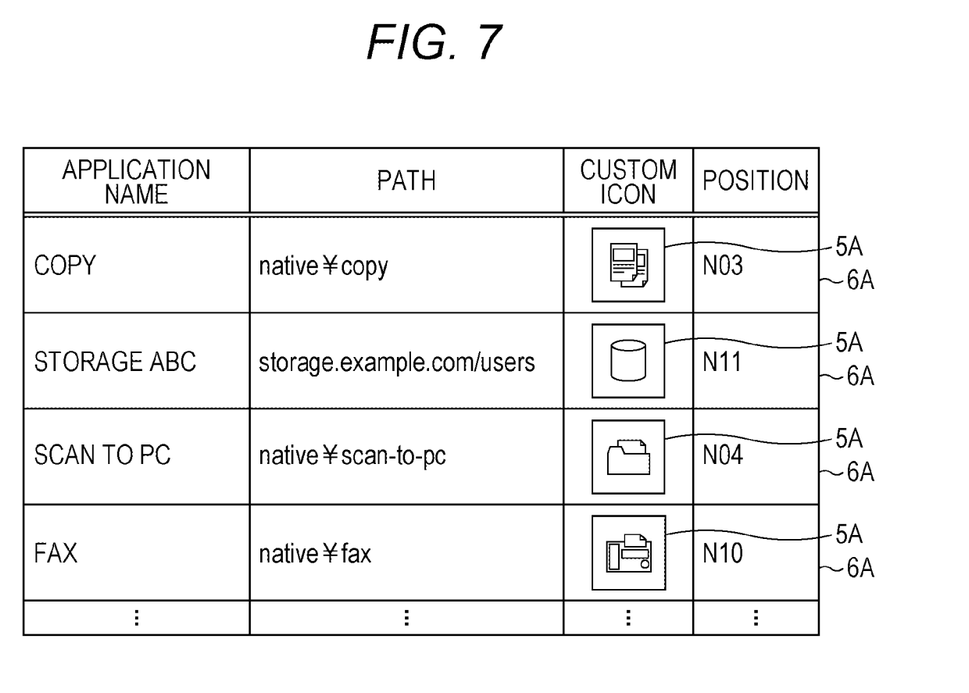
FIG. 7 is a diagram illustrating exemplary icon data.

FIG. 3 is a diagram illustrating an exemplary functional configuration of the image forming apparatus 1. FIG. 4 is a diagram illustrating an exemplary home screen 5. FIGS. 5A and 5B are diagrams illustrating exemplary positions of areas 5D in the home screen 5. FIGS. 6A to 6D are diagrams for illustrating an exemplary method of generating a custom icon 5A. FIG. 7 is a diagram illustrating exemplary icon data 6A.

According to the home screen providing program 10P, an original icon acquisition unit 101, a base button color determination unit 102, a position determination unit 103, a custom icon registration unit 104, a home screen data storage unit 105, a home screen display unit 106, a home screen updating unit 107, an application screen display unit 108, and the like illustrated in FIG. 3 are implemented in the image forming apparatus 1. The home screen 5 as illustrated in FIG. 4 is provided to the user as a launcher.

The custom icon 5A for each frequently used or important application is arranged on the home screen 5. Hereinafter, such an application will be described as a "home application 4". The home application 4 includes the native application and the non-native application. Hereinafter, each home application 4 may be distinctively described as a "home application 401", a "home application 402", a "home application 403", and so on.

The custom icon 5A is an object for calling the home application 4 corresponding thereto. That is, it functions like a shortcut.

The home screen 5 is provided with a plurality of areas 5D of the size substantially the same as the custom icon 5A. Each custom icon 5A is arranged in any one area 5D not to overlap.

Moreover, unique identifiers "N01", "N02", and so on are given to the area 5D. For example, as illustrated in FIG. 5A, ten areas 5D are provided, and the identifiers "N01", "N02", . . . , and "N10" are given to the respective areas.

In a case where the number of the home applications 4 exceeds 10, the home screen 5 is extended. For example, in a case where the number of home applications 4 is 30, it is extended to the right as illustrated in FIG. 5B. However, when it is extended, the entire home screen 5 cannot be displayed at once, and the home screen 5 is divided into a plurality of pages and displayed. In the example of FIG. 5B, each area 5D of "N01" to "N10" is displayed as a first page, each area 5D of "N11" to "N20" is displayed as a second page, and each area 5D of "N21" to "N30" is displayed as a third page.

When the home screen providing program 10P is started for the first time, the custom icon 5A of each existing home application 4 is prepared by the original icon acquisition unit 101 or the custom icon registration unit 104 to be arranged on the home screen 5 as follows.

The original icon acquisition unit 101 obtains an original icon 5B of each home application 4. The original icon 5B is an icon prepared in advance by the provider (vendor) of the home application 4 as illustrated in FIGS. 6A to 6D. Each original icon 5B has a different size. The original icon 5B is obtained as follows.

In general, the original icon 5B of the native application may be stored in a predetermined directory of the operating system of the image forming apparatus 1 as an image file. Alternatively, it may be included in a plurality of files (file group) included in the native application as an image file. When the home application 4 is the native application, the original icon acquisition unit 101 obtains the original icon 5B of the home application 4 from the predetermined directory or the file group.

Furthermore, in general, the original icon 5B of the non-native application may be stored as image data in a web server (e.g., web server 2A) of the provider providing the non-native application. Alternatively, in a similar manner to the case of the native application, it may be included in a plurality of files (file group) included in the non-native application as an image file. When the home application 4 is the non-native application, the original icon acquisition unit 101 obtains the original icon 5B of the home application 4 from the web server or the file group.

The base button color determination unit 102 determines a background color (overall color) of a base button 5C for each home application 4. As illustrated in FIGS. 6A to 6D, the original icon 5B is superimposed onto the base button 5C, thereby generating the custom icon 5A. That is, the base button 5C is a button used as a background of the custom icon 5A. All base buttons 5C have the same sizes and shapes. Hereinafter, a method of determining the base button 5C will be described on the basis of an exemplary case where the base button 5C of the home application 401 is determined.

(1) Determination Based on an Attribute of the Original Icon 5B

The base button color determination unit 102 determines the most frequently used color of the original icon 5B of the home application 401. Then, the background color of the base button 5C is determined to be the determined color. For example, in a case where the original icon 5B of the home application 401 includes a green color of 60% and a yellow color of 40%, the most frequently used color is determined to be green, and the background color of the base button 5C is determined to be green.

The base button color determination unit 102 may further adjust the density of the background color of the base button 5C according to the content rate of the most frequently used color.

That is, for example, in a case where the content rate of the color is Ha and the densities of the three primary colors (R, G, and B) are Dr, Dg, and Db, respectively, the base button color determination unit 102 may determine the background color of the base button 5C to be a color in which the densities of the respective three primary colors are Dr x Ha, Dg x Ha, and Db x Ha, respectively.

Alternatively, in order to give a contrast of density levels between the original icon 5B and the base button 5C, the base button color determination unit 102 may determine the background color of the base button 5C to be a color in which the densities of the respective three primary colors are Dr×(1−Ha), Dg×(1−Ha), and Db×(1−Ha), respectively.

Alternatively, the base button color determination unit 102 may decrease the density of the background color of the base button 5C by a predetermined amount or ratio when the density of the determined color is equal to or more than predetermined density, and may increase the density of the background color of the base button 5C by a predetermined amount or ratio when it is less than the predetermined density.

Alternatively, the base button color determination unit 102 may adjust parameters other than the densities of the three primary colors. Any one of or a plurality of hue, brightness, intensity, and saturation may be increased or decreased by a predetermined value (e.g., by 10%).

(2) Determination Based on an Attribute of the Home Application 401

The base button color determination unit 102 determines the provider of the home application 401. In general, the provider may be described in any file in the file group included in the application. Accordingly, the base button color determination unit 102 determines the provider on the basis of the file group included in the home application 401.

The base button color determination unit 102 then determines the background color of the base button 5C to be a color corresponding to the determined provider. This color may be determined by querying the web server of the determined provider. Alternatively, a color corresponding to each of a plurality of providers may be registered in a database in advance, and determination may be made by referring to the database.

Alternatively, the base button color determination unit 102 may determine the type of the home application 401 instead of the provider of the home application 401, and may determine the color corresponding to the determined type. Examples of the type include native, office-based, cloud storage, and groupware.

The position determination unit 103 determines a position at which the custom icon 5A of each home application 4 is to be arranged. That is, the area 5D (see FIGS. 5A and 5B) in the home screen 5 in which the custom icon 5A is to be arranged is allocated for each custom icon 5A. Hereinafter, an exemplary method of allocating the area 5D will be described.

The position determination unit 103 allocates the area 5D of "N01", "N02", "N03", and so on to the custom icon 5A of the home application 4 in the order in which the background color of the base button 5C is determined by the base button color determination unit 102. For example, in the case where the background color of the base button 5C has been determined in the order of the home applications 401, 402, 403, and so on, the areas 5D of "N01", "N02", "N03", and so on are allocated to the custom icons 5A of the home applications 401, 402, 403, and so on, respectively.

Alternatively, the position determination unit 103 groups the respective home applications 4 according to the type, and allocates a page to each group. Then, optional areas 5D of the pages of the groups to which the respective home applications 4 belong are allocated to the respective custom icons 5A.

For example, it is assumed that the types of the home applications 401 to 403, 411 to 413, and 421 to 424 are native, the types of the home applications 404 to 406, 414 to 416, and 425 to 428 are office-based, and the types of the home applications 407 to 410, 417 to 420, and 429 to 430 are cloud storages. In this case, the position determination unit 103 allocates the areas 5D of the first page to the respective custom icons 5A of the home applications 401 to 403, 411 to 413, and 421 to 424 one by one, allocates the areas 5D of the second page to the respective custom icons 5A of the home applications 404 to 406, 414 to 416, and 425 to 428 one by one, and allocates the areas 5D of the third page to the respective custom icons 5A of the home applications 407 to 410, 417 to 420, and 429 to 430 one by one.

Alternatively, in the case where the number of the home applications 4 is 10 or less, the position determination unit 103 may sort the home applications 4 for each type and allocate the areas 5D in the sort order.

The custom icon registration unit 104 generates the icon data 6A for each home application 4, and causes the home screen data storage unit 105 to store it.

As illustrated in FIG. 7, an application name, a path, a custom icon 5A, a position, and the like are indicated in the icon data 6A.

The "application name" indicates a name of the home application 4. The "path" indicates a path of a main program of the home application 4. Note that a network path (e.g., URL) of the home application 4 is indicated in the case where the home application 4 is executed by a web browser.

The "position" indicates an identifier of the area 5D in which the custom icon 5A is arranged. The custom icon 5A is generated by the custom icon registration unit 104. As illustrated in FIGS. 6A to 6D, the custom icon registration unit 104 generates the custom icon 5A by superimposing the original icon 5B onto the base button 5C having the background color determined by the base button color determination unit 102. At this time, the original icon 5B is appropriately scaled so that the size relative to the base button 5C becomes a predetermined size. For example, it is scaled to be a size of about 60% of the base button 5C in each of the longitudinal and lateral directions.

Furthermore, the home screen data storage unit 105 stores data indicating the background color of the home screen 5 as background data 6B.

As described above, the custom icon 5A of each existing home application 4 is prepared when the home screen providing program 10P is started for the first time. When the home application 4 is newly set up in the image forming apparatus 1 thereafter, the original icon acquisition unit 101 or the custom icon registration unit 104 prepares the custom icon 5A of the home application 4. Hereinafter, a method of preparation will be described on the basis of an exemplary case where a home application 412 is newly set up.

The original icon acquisition unit 101 obtains the original icon 5B of the home application 412 using the method described above.

The base button color determination unit 102 determines the background color of the base button 5C of the home application 412 using the method described above.

The position determination unit 103 determines a position at which the custom icon 5A of the home application 412 is to be arranged. That is, the area 5D is allocated to this custom icon 5A. For example, a method of allocation is as follows.

The position determination unit 103 selects one area 5D in the home screen 5 to which no existing custom icon 5A is allocated, and allocates it to the custom icon 5A of the home application 412. If there is no such an area 5D, the home screen 5 is extended, that is, a new page is added. Then, one area 5D in the new page is selected, and is allocated to the custom icon 5A of the home application 412. Note that, in the case where a page is allocated for each type, it is preferable to select one area 5D from the page corresponding to the home application 412.

Then, the custom icon registration unit 104 generates the icon data 6A (see FIG. 7) for the home application 412, and causes the home screen data storage unit 105 to store it.

Alternatively, the position determination unit 103 may reallocate the area 5D for all of the custom icon 5A of the home application 412 and the custom icon 5A of the existing home application 4.

In that case, while the custom icon registration unit 104 generates the icon data 6A of the home application 412 and stores it in the home screen data storage unit 105, the position indicated by the icon data 6A of each existing home application 4 may be updated.

When a predetermined event occurs, such as when a rest command is input, the home screen display unit 106 displays the home screen 5 (see FIG. 4) on the touch panel display 10g on the basis of the icon data 6A and the background data 6B stored in the home screen data storage unit 105.

However, in the case where the home screen 5 has a plurality of pages, the home screen display unit 106 displays a default page. For example, when the first page is the default, the first page is displayed. Then, the next page is displayed when the user flicks toward the left, and the previous page is displayed when the user flicks toward the right.

The user or the administrator can optionally designate the area 5D in which the custom icon 5A is to be arranged in a similar manner to the icon or button in the conventional launcher.

The home screen updating unit 107 updates the position indicated by the icon data 6A on the basis of the designation made by the user or the administrator. For example, in the case where, while the custom icon 5A of the home application 413 is allocated in the area 5D of "N13", the area 5D of "N22" is designated as the area 5D in which the custom icon 5A is to be arranged, the home screen updating unit 107 updates the position indicated by the icon data 6A of the home application 413 from "N13" to "N22".

When the user taps any of the custom icons 5A, the application screen display unit 108 displays, on the basis of the path indicated by the icon data 6A of the home application 4, the screen of the home application 4 corresponding to the tapped custom icon 5A on the touch panel display 10g instead of the home screen 5.

For example, in the case where the path indicated by the icon data 6A is a path of the main program, the main program is activated to display the screen of the home application 4. Alternatively, in the case where the path indicated by the icon data 6A is a network path, the web browser is caused to access the web page or the website corresponding to the network path to display the screen of the home application 4.

Figure 8:
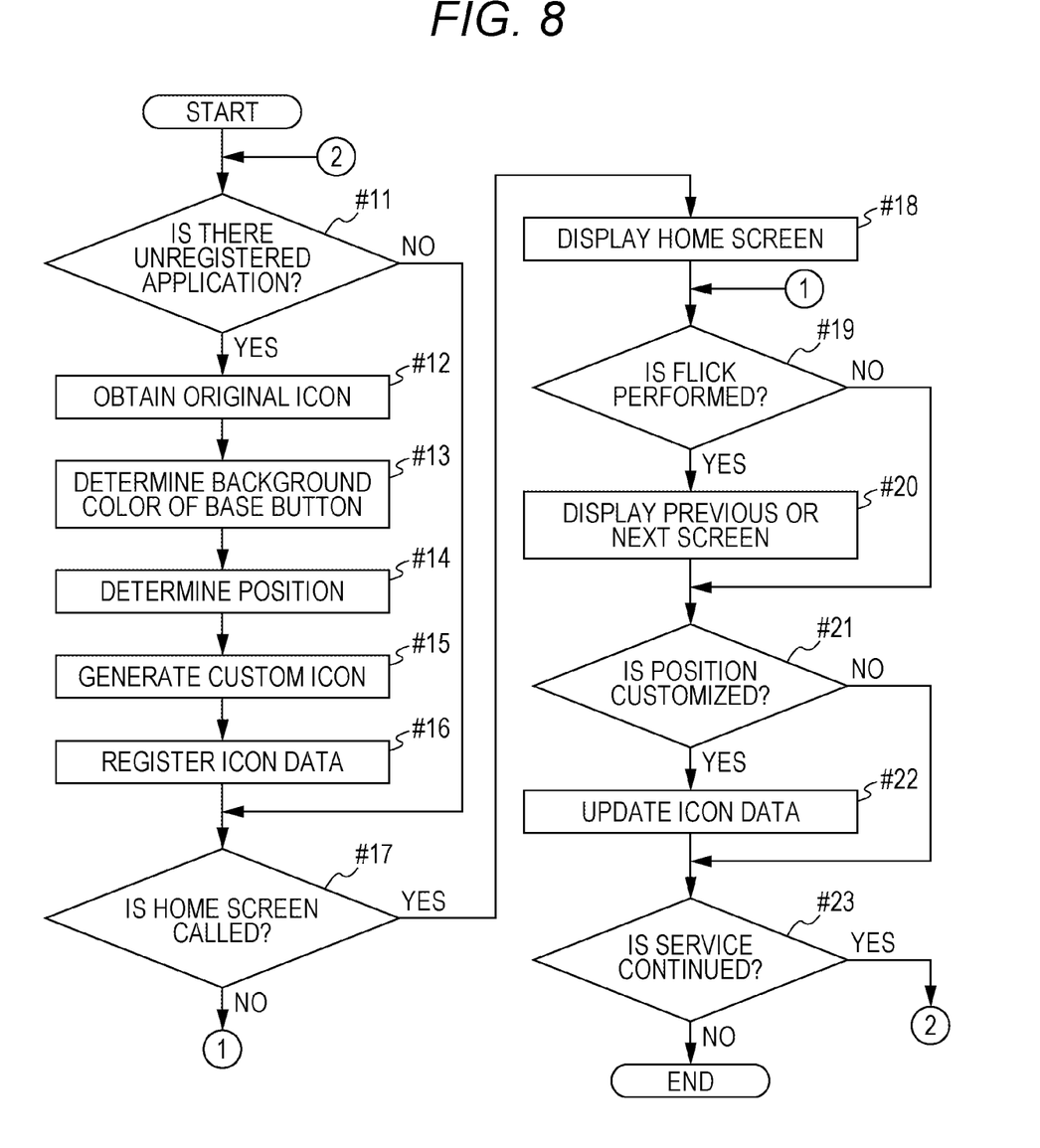
FIG. 8 is a flowchart for illustrating an exemplary overall flow of a process in the image forming apparatus.

FIG. 8 is a flowchart for illustrating an exemplary overall flow of a process in the image forming apparatus 1.

Next, the overall flow of the process at the time when the image forming apparatus 1 provides the home screen 5 will be described with reference to the flowchart.

The image forming apparatus 1 executes the process according to the procedure illustrated in FIG. 8 on the basis of the home screen providing program 10P.

When there is a home application 4 for which the custom icon 5A has not been prepared (Yes in #11 in FIG. 8), the image forming apparatus 1 obtains the original icon 5B of the home application 4 (#12), and determines the background color of the base button 5C of the home application 4 (#13). The area 5D in which the custom icon 5A of the home application 4 is to be arranged is determined (#14).

Further, the image forming apparatus 1 appropriately scales the obtained original icon 5B and superimpose it onto the base button 5C having the determined background color, thereby generating the custom icon 5A (#15). Then, data indicating the application name and the path of the home application 4, the generated custom icon 5A, and the determined position (area 5D) is generated and stored in the home screen data storage unit 105 as icon data 6A (see FIG. 7) (#16).

It is often the case that, when the home screen providing program 10P is started for the first time, there is a plurality of home applications 4 for which the custom icon 5A has not been prepared. Accordingly, at this time, the image forming apparatus 1 collectively executes the preparation of the custom icons 5A of the respective home applications 4 (processing of steps #11 to #16). In particular, in the case of grouping, allocation of the area 5D is collectively executed.

Alternatively, when a predetermined event for displaying the home screen 5 (see FIG. 4) has occurred (Yes in #17), the image forming apparatus 1 displays the home screen 5 on the basis of the background data 6B and the icon data 6A of each home application 4 (#18). In the case where the home screen 5 has a plurality of pages, a default page is displayed.

When the user flicks the home screen 5 toward the left or right while any page is displayed (Yes in #19), the image forming apparatus 1 displays the next page or the previous page (#20).

Alternatively, when the user or the administrator designates a new position of the custom icon 5A of a certain home application 4 (Yes in #21), the image forming apparatus 1 updates the icon data 6A of the home application 4 such that the designated new position is indicated (#22).

While the home screen providing program 10P is being executed (Yes in #23), the image forming apparatus 1 executes the processing of steps #11 to #16, the processing of step #18, the processing of step #20, and the processing of step #22 as appropriate.

According to the present embodiment, it is possible to provide the user with a menu screen with visibility higher than ever even in the case where the home applications 4 are provided by various providers.

In addition, even in the case where a certain home application 4 is a non-native application, the maker of the image forming apparatus 1 does not need to prepare an icon for the home application 4, whereby the maker of the image forming apparatus 1 can provide the user with a menu screen more easily than ever.

Although the base button color determination unit 102 determines only the background color of the base button 5C in the present embodiment, the background color may be fixedly determined in advance, and the pattern of the background (entirety) may be determined instead of the background color. For example, any pattern, such as gingham, tartan, argyle, vertical stripes, and horizontal stripes, may be determined depending on the type of the home application 4, and the determined pattern may be added to the background of the base button 5C.

Although all the base buttons 5C have the same sizes and shapes in the present embodiment, the size or shape may be made different according to the type of the home application 4 or the like. For example, the base button 5C of the office-based home application 4 may be smaller than the base button 5C of another type of the home application 4. Alternatively, the shape of the base button 5C of the user's favorite home application 4 may be star-shaped, and the base button 5C of another home application 4 may be square-shaped.

Figure 9:
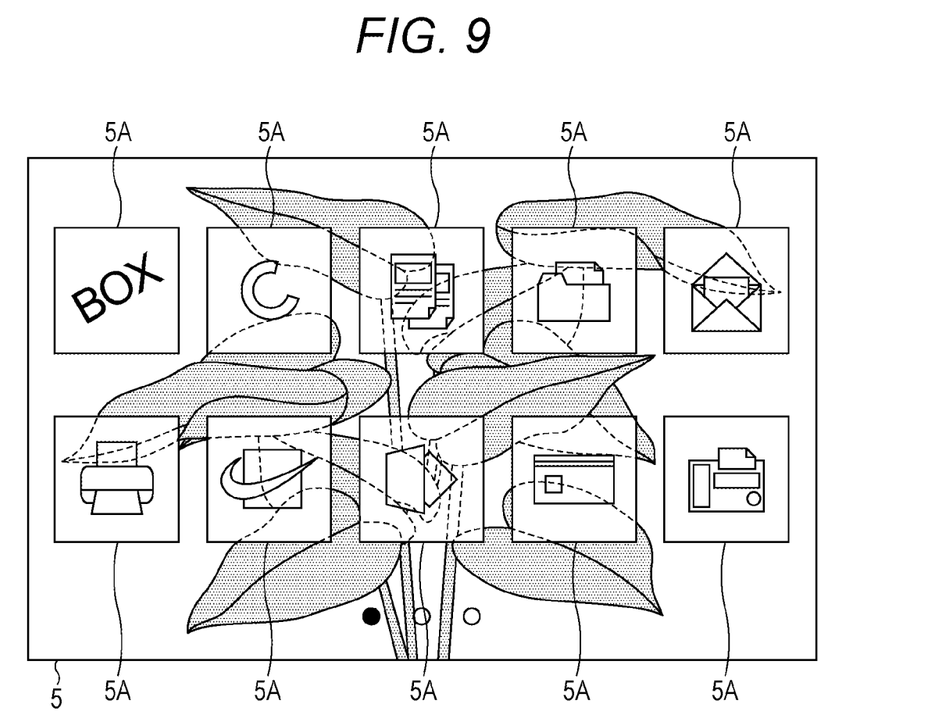
FIG. 9 is a diagram illustrating a variation of the home screen.

FIG. 9 is a diagram illustrating a variation of the home screen 5. Although the exemplary case where the background of the home screen 5 is monochromatic has been described in the present embodiment, an image such as a picture and an illustration may be used as the background of the home screen 5, as illustrated in FIG. 9. In that case, image data of an image such as a picture and an illustration is used as the background data 6B.

Furthermore, in that case, that is, in the case where the background of the home screen 5 has two or more colors, the base button color determination unit 102 may make the background of each base button 5C transparent. That is, it may be determined to be what is called a transparent color (color in which the background of the home screen 5 can be seen through). In the case of determining the transparent color, it may be determined for all the background colors of the respective base buttons 5C in common. For example, it may be determined to be all white transparent color. The original icon 5B may also have transparency.

Furthermore, in the case where the background of the home screen 5 is changed from the monochrome to the image or from the image to the monochrome, the home screen updating unit 107 may redetermine the color of the base button 5C of each home application 4 and whether the transparent color is to be applied, and may update the icon data 6A according to the result.

Alternatively, the base button color determination unit 102 may determine to apply the transparent color even if the background of the home screen 5 is monochromatic.

Although the home screen updating unit 107 updates the icon data 6A when the user or the administrator designates a new position of the custom icon 5A in the present embodiment, it may regenerate, when the terminal device 2B or the like gives an instruction from the user, the icon data 6A according to the state at that time point.

Although the custom icons 5A are generated for all the home applications 4 in the present embodiment, an icon or a button prepared in advance may be used as the custom icon 5A with respect to the native application.

Although the image forming apparatus 1 generates the icon data 6A such that the custom icon 5A is indicated in the present embodiment, the icon data 6A may be generated such that the original icon 5B and the base button 5C are indicated, and the custom icon 5A may be generated on the basis of the original icon 5B and the base button 5C each time the home screen 5 is displayed.

Although the image forming apparatus 1 generates the custom icon 5A for each home application 4 and arranges it on the home screen 5 in the present embodiment, the custom icon 5A of a box, a file, and the like may be generated and arranged.

In addition, the configuration, the content of processing, the order of processing, the configuration of screens, the data configuration, and the like of the entire or each unit of the image forming apparatus 1 and the image processing system 100 can be changed as appropriate according to the spirit of the present disclosure.

Although embodiments of the present disclosure have been described and illustrated in detail, the disclosed embodiments are made for purposes of illustration and example only and not limitation. The scope of the present disclosure should be interpreted by terms of the appended claims.

As used throughout this application, the words "can" and "may" are used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

What is claimed is:

1. An image forming apparatus, comprising:
    an acquisitor that obtains a first icon of each of a plurality of applications, wherein the plurality of applications are provided by a plurality of different entities, and wherein at least one of the plurality of applications is non-native to the image forming apparatus;
    a generator that generates, after the first icons are obtained, a second icon of each of the plurality of applications by superimposing the respective first icon onto a base image, each base image having at least one of a same size and shape; and
    a display controller that causes display of the second icons to allow a user to select any of the plurality of applications.

2. The image forming apparatus according to claim 1, further comprising:
    an execution controller that executes, when any of the second icons is selected, an application corresponding to the selected second icon from among the plurality of applications.

3. The image forming apparatus according to claim 1, wherein the acquisitor obtains the first icon of each of the plurality of applications from a provider of each of the plurality of applications.

4. The image forming apparatus according to claim 1, wherein, when the first icon does not have a predetermined size that can fit in the base image, the generator scales the first icon to the predetermined size and superimposes the first icon onto the base image to generate the second icon.

5. The image forming apparatus according to claim 1, further comprising:
    a position determiner that determines a position of the second icon of each of the plurality of applications in a screen,
    wherein the display controller displays, as the screen, a screen in which each of the second icons is arranged at the position determined by the position determiner.

6. The image forming apparatus according to claim 5, further comprising:
    a storage that stores the position of the second icon of each of the plurality of applications, the position being determined by the position determiner,
    wherein the display controller displays a screen in which the second icon of each of the plurality of applications is arranged at each of the positions stored in the storage.

7. The image forming apparatus according to claim 6, wherein the storage updates the stored position in response to a user operation.

8. The image forming apparatus according to claim 1, further comprising:
    a color determiner that determines a background color of the base image of each of the plurality of applications,
    wherein the generator generates the second icon of each of the plurality of applications using each of the background colors determined by the color determiner as an overall color of the base image of each of the plurality of applications.

9. The image forming apparatus according to claim 8, wherein the color determiner determines the background color of the base image of each of the plurality of applications to be a color most frequently used for each of the first icons.

10. The image forming apparatus according to claim 8, wherein the color determiner determines the background color of the base image of each of the plurality of applications to be an approximate color in which density, hue, saturation, intensity, or brightness of a color most frequently used for each of the first icons is adjusted.

11. The image forming apparatus according to claim 10, wherein the color determiner determines the background color such that the first icon has density higher than density of the base image.

12. The image forming apparatus according to claim 10, wherein the color determiner determines the background color such that the first icon has density lower than density of the base image.

13. The image forming apparatus according to claim 8, wherein the color determiner determines the background color of the base image of each of the plurality of applications to be a color corresponding to a provider providing each of the plurality of applications.

14. The image forming apparatus according to claim 8, wherein the color determiner determines the background color of the base image of each of the plurality of applications to be a color corresponding to a type of each of the plurality of applications.

15. The image forming apparatus according to claim 8, wherein the color determiner determines a pattern together with the background color of the base image of each of the plurality of applications.

16. The image forming apparatus according to claim 1, wherein, when only one color is used as a background color of a screen, the display controller displays the screen such that the base image has transparency.

17. The image forming apparatus according to claim 8, wherein, when two or more colors are used as a background color of a screen, the color determiner determines the background color of all of the base images to be white, and the display controller displays the screen such that the base images have transparency.

18. The image forming apparatus according to claim 1, wherein the base image of each of the plurality of applications has the same size and the shape.

19. The image forming apparatus according to claim 1, wherein the base image of each of the plurality of applications has the same size, and has a shape corresponding to each attribute as the shape.

20. The image forming apparatus according to claim 1, wherein the base image of each of the plurality of applications has the same shape, and has a size corresponding to each attribute as the size.

21. A method for selecting an application, the method comprising:
   obtaining a first icon of each of a plurality of applications, wherein the plurality of applications are provided by a plurality of different entities, and wherein at least one of the plurality of applications is non-native to an image forming apparatus;
   generating, after the first icons are obtained, a second icon of each of the plurality of applications by superimposing the respective first icon onto a base image, each base image having at least one of a same size and shape; and
   displaying the second icons to allow a user to select any of the plurality of applications.

22. A non-transitory recording medium storing a computer readable program to be used in an image forming apparatus, the program causing the image forming apparatus to perform:
   obtaining a first icon of each of a plurality of applications, wherein the plurality of applications are provided by a plurality of different entities, and wherein at least one of the plurality of applications is non-native to the image forming apparatus;
   generating, after the first icons are obtained, a second icon of each of the plurality of applications by superimposing the respective first icon onto a base image, each base image having at least one of a same size and shape; and
   causing display of the second icons to allow a user to select any of the plurality of applications.

\* \* \* \* \*